United States Patent [19]

Kishi et al.

[11] Patent Number: 5,124,209
[45] Date of Patent: Jun. 23, 1992

[54] PAINT FILM ARRANGEMENT

[75] Inventors: Hiroyuki Kishi, Yokohama; Hitoshi Kimura, Chigasaki; Tsuneo Sakauchi; Katsuya Yamamoto, both of Yokohama, all of Japan

[73] Assignee: Nissan Motor Co., Ltd., Yokohama, Japan

[21] Appl. No.: 452,831

[22] Filed: Dec. 20, 1989

[30] Foreign Application Priority Data

Dec. 28, 1988 [JP] Japan .................. 63-329473

[51] Int. Cl.$^5$ .................. B32B 15/08; B32B 27/38
[52] U.S. Cl. .................. 428/413; 428/416; 428/458; 428/480
[58] Field of Search .............. 428/413, 416, 458, 480

[56] References Cited

U.S. PATENT DOCUMENTS

| 4,619,746 | 10/1986 | Delaney et al. | 204/181.1 |
| 4,711,917 | 12/1987 | McCollum et al. | 523/400 |
| 4,761,337 | 8/1988 | Guagliardo et al. | 428/425.8 |

FOREIGN PATENT DOCUMENTS 62-61077 of 0000 Japan .
61-209278 of 0000 Japan .

OTHER PUBLICATIONS

"Colouring Material Study Representation Summary", (1985), (1A-9).

Primary Examiner—Merrell C. Cashion, Jr.
Assistant Examiner—D. S. Nakarani
Attorney, Agent, or Firm—Lowe, Price, LeBlanc & Becker

[57] ABSTRACT

A paint film arrangement formed on an outer panel of an automotive vehicle. The paint film arrangement comprises a film of an electrodeposition paint formed on the surface of a steel plate of the automotive vehicle outer panel. The surface of the electrodeposition paint film has a center line average height Ra within a range of $0.3\mu \leq Ra \leq 0.8\mu$. The total of values of power spectrum of the surface of the electrodeposition paint film is not more than 80 $\mu V^2$ within a wavelength range not more than 0.5 mm. Additionally, a film of an intermediate coat paint is formed on the surface of the electrodeposition paint film. The intermediate coat paint has a hardening starting time ranging from 15 to 20 minutes. The hardening starting time is determined according to a logarithmic decrement of the intermediate coat paint by an oscillated pendulum type viscoelasticity measuring device.

6 Claims, 1 Drawing Sheet

PAINT FILM ARRANGEMENT

BACKGROUND OF THE INVENTION

1. Field of the Invention

This invention relates to improvements in a paint film arrangement coated on the outer panel of an automotive vehicle in order to increase the rust resistance for an edge of steel plate and the brightness of a coated paint film after completion of a finish coat.

2. Description of the Prior Art

In general, a paint film arrangement for an automotive vehicle outer panel includes an electrodeposition paint film for the purpose of rust prevention, an intermediate coat paint film for the purpose of thickening the paint film arrangement, and a finish coat paint film for the purpose of colouring. The automotive vehicle outer panel coated with such a paint film arrangement is required to have good smoothness, gloss and the like. Total evaluation of such characteristics has been usually accomplished by using a so-called PGD value which is measured by a PGD (Portable Gloss and Distinction) meter. This PGD meter is, for example, a PGD-3 type one (produced by a Japan Colour Research Institute in Japan). It is known to those skilled in the art, that the PGD value becomes high as the smoothness and gloss of the finish coating film is higher. Here, the gloss depends on the performance of the finish coat paint film and seems to be an independent function of a finish coat paint. Concerning the smoothness, it is largely affected by the smoothness of under-coat films and therefore the electrodeposition paint film is eagerly required to have a good smoothness.

As a criterion for the smoothness, a so-called center line average height (roughness) Ra is usually used. The center line average height Ra is measured by using a cutoff wavelength of 0.8 mm. The center line average height Ra smaller than 0.3 $\mu$ is usually used for conventional automotive vehicle electrodeposition paint film from the view point of external appearance. In such a case, an intermediate coat paint is designed to be intended to harden at a shorter time in order to ensure the smoothness on a horizontal plane and to prevent the smoothness from degrading due to run of paint during baking on a vertical plane. In this regard, the usual used intermediate coat paint has a hardening starting time not less than 12 minutes and less than 15 minutes, measured by an Oscillated Pendulum Analysis (OPA) with an oscillated pendulum type viscoelasticity measuring device. Thus, the conventional paint film arrangement is formed by coating the intermediate coat paint having the hardening starting time (by the Oscillated Pendulum Analysis) less than 15 minutes, on the surface of the electrodeposition paint film having a center line average height not larger than 0.3 $\mu$.

With the above-discussed paint film arrangement, in order to minimize the center line average height of the electrodeposition coat film, it is carried out to increase the flowability of the electrodeposition paint film during melting thereof. However, under the action of surface tension of the molten coat film at an edge portion of the steel plate of the automotive vehicle outer panel, the edge of the steel plate is exposed without the coat film, so that the above-discussed conventional paint film arrangement is inferior in a so-called edge corrosion resistance.

If the edge corrosion resistance is intended to be improved in the conventional paint film arrangement, it may be proposed to increase the viscosity of the electrodeposition paint film in a molten condition. For this purpose, there are proposed a measure to increase the concentration of pigment in the electrodeposition paint (i.e., P(pigment)/B(binder) ratio), a measure to add non-molten type cross-linking resin particles (i.e., a reology control agent) to the electrodeposition paint, and a measure to lower the hardening temperature to suppress flowing of the electrodeposition paint in a molten state under a cross-linking reaction. However, these measures largely degrade the flowability of the electrodeposition paint in a molten state. Assuming that these measures are taken to obtain a good edge corrosion resistance, the coated surface of the electrodeposition paint has a center line average height Ra not less than 0.3 $\mu$. Accordingly, in a case in which conventional intermediate and finish coats are formed on the thus formed electrodeposition paint film, the PGD value of the paint film arrangement on a horizontal plane largely lowers, thereby degrading a commercial value of the resultant automotive vehicle.

In view of the above, it has been eagerly desired in an automotive industry to obtain a paint film arrangement exhibiting both high edge corrosion resistance and high external appearance.

SUMMARY OF THE INVENTION

As a result of a variety of researches and developments for paint film arrangements exhibiting high edge corrosion resistance and high external appearance, the inventors have experimentally found that the PGD value on a horizontal plane is lowered while no change of the same value is made on a vertical plane, in a painting system which is constituted by coating conventional intermediate and finish coat paints on the surface of an electrodeposition paint film whose flowability is lowered (See Comparative Examples 1 and 2). They have taken this into consideration, with the relationship between the degrees of deterioration of smoothness (due to run) on the vertical plane and the hardening starting time measured by the OPA. As a result, it has been confirmed that in a case of the intermediate coat paint having a hardening starting time not more than 20 minutes, the PGD value on the vertical plane after coating of the finish coat paint is the same as in a case in which the conventional intermediate coat paint is used (See Comparative Examples 1 to 10).

Besides, it has been confirmed that the same result is obtained for the vertical plane even in a case of using a low flowability electrodeposition paint; however, the PGD value on the horizontal plane is different according to the used electrodeposition paints and intermediate coat paints (See Comparative Examples 1 to 25).

The inventors' researches and developments taking account of the above-discussed experimental results have found the following facts: In case of using an intermediate coat paint having a hardening starting time not more than 15 minutes measured by the OPA, the PGD value of the finish coat paint on a vertical plane is about the same as in the conventional paint film arrangement. Additionally, in the case of using an intermediate coat paint having the hardening starting time not less than 15 minutes, it is very high in an ability to erase a roughness not less than 0.5 mm in wave length, in the surface of the electrodeposition paint. Even in the case of using a manner to previously reduce with the electrodeposition paint of a roughness not more than 0.5 mm in wavelength which is impossible to be erased even by the above intermediate coat paint, it has been found that an electrodeposition paint high in the edge corrosion resistance can be obtained. The present invention has been reached on the basis of the above-discussed newly founded knowledge.

A paint film arrangement of the present invention is comprised of a film of an electrodeposition paint. The surface of the film has a center line average height Ra within a range of $0.3 \mu \leq Ra \leq 0.8 \mu$. The total of values of power spectrum within a wavelength range not less than 0.5 mm of the surface is not more than 80 $\mu V^2$. Additionally, a film of an intermediate coat paint is formed on the surface of the electrodeposition paint film. The intermediate coat paint film has a hardening starting time ranging from 15 to 20 minutes. The hardening starting time is determined according to a logarithmic decrement of viscoelasticity of the intermediate coat paint film by an oscilated pendulum type viscoelasticity measuring device.

Accordingly, the paint film arrangement of the present invention can be improved in both edge corrosion resistance of a steel plate and finished external appearance of the painted steel plate.

DETAILED DESCRIPTION OF THE INVENTION

Figure 1:
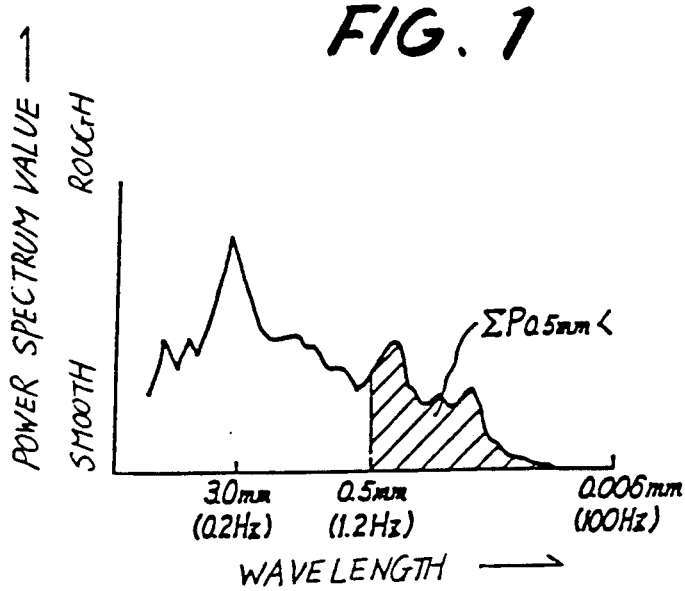
FIG. 1 is a graph showing total of values of power spectrum of an electrodeposition paint film forming part of a paint film arrangement according to the present invention.

According to the present invention, a paint film arrangement is comprised of a film of an electrodeposition paint, the surface of the film having a center line average height Ra within a range of $0.3 \mu \leq Ra \leq 0.8 \mu$, total of values of power spectrum within a wavelength range not less than 0.5 mm of said surface being not more than 80 $\mu V^2$; and a film of an intermediate coat paint formed on the electrodeposition paint film, the intermediate coat film having a hardening starting time ranging from 15 to 20 minutes, said hardening starting time being determined according to a logarithmic decrement of the intermediate coat paint film by an oscillated pendulum type viscoelasticity measuring device.

As mentioned above, according to the present invention, the surface of the electrodeposition paint film necessarily has a center line average height Ra not less than $0.3 \mu$, measured with a cutoff wavelength of 0.8 mm in order to obtain a high edge corrosion resistance. Besides, from the view point of the finishing condition with an intermediate coat paint, the maximum value of the center line average height Ra must be suppressed at a value of $0.8 \mu$. Additionally, the total ($\Sigma P_{0.5 \, mm>}$) of the power spectrums within the wavelength not more than 0.5 mm according to a surface frequency analysis is decided to be not more than 80 $\mu V^2$. The reasons why the surface condition of the electrodeposition paint is defined by the above-mentioned two values Ra and $\Sigma P_{0.5 \, mm>}$ is that the surface condition of the intermediate paint film depends not only on a surface roughness value Ra but also on another surface roughness value $\Sigma P_{0.5 \, mm>}$. In other words, although the values Ra are the same in two cases, the electrodeposition paint surface conditions after coating the intermediate coat paint film may be different from each other, and depends on the difference in the surface roughness value $\Sigma P_{0.5 \, mm>}$.

The values Ra and $\Sigma P_{0.5 \, mm>}$ are evaluation criteria for surface roughness within different wavelength ranges. The value Ra represents the surface roughness (average amplitude value) within a wavelength range from 0.8 to 0.5 mm, while the value of $\Sigma P_{0.5 \, mm>}$ represents the surface roughness (total of the square of amplitude value of the respective wavelength). Thus, the values Ra and $\Sigma P_{0.5 \, mm}$ are essential to find and define the feature of the surface profile of the coated paint film.

The value Ra is defined to be $0.8 \mu$ in maximum for the reasons set forth below. The value Ra of the electrodeposition paint film surface is in a good interelationship to the hardening starting time of the intermediate coat paint film, measured by an Oscillated Pendulum Analysis (OPA). More specifically, in the case of an intermediate coat paint film (a conventional intermediate coat paint film) having the hardening starting time of 12 to 15 minutes, it is possible to smoothen the surface of the electrodeposition paint film surface having the surface roughness up to $0.3 \mu$. In case of the intermediate coat paint film having the hardening starting time of 15 to 20 minutes, it is possible to smoothen the surface of the electrodeposition paint film surface having the surface roughness not less than $0.8 \mu$. In case of an intermediate coat paint film having a hardening starting time not less than 20 minutes, smoothnening the surface roughness over $0.8 \mu$ of the electrodeposition paint film is possible; however, a surface condition on a vertical plane is degraded owing to run of the intermediate coat paint. Therefore, the value Ra of the electrodeposition paint film is decided to be up to $0.8 \mu$, and the hardening starting time of the intermediate coat paint film is decided to be within a range from 15 to 20 minutes.

The value $\Sigma P_{0.5 \, mm>}$ is decided to be not more than 80 $\mu V^2$ for the following reasons: Only the electrodeposition paint film having the surface roughness not more than 80 $\mu V^2$ can be smoothened with the intermediate coat paint having the hardening starting time ranging from 15 to 20 minutes. It will be understood that it is impossible to smoothen the electrodeposition paint film having the surface roughness over 80 $\mu V^2$ with the intermediate coat paint.

Figure 2:
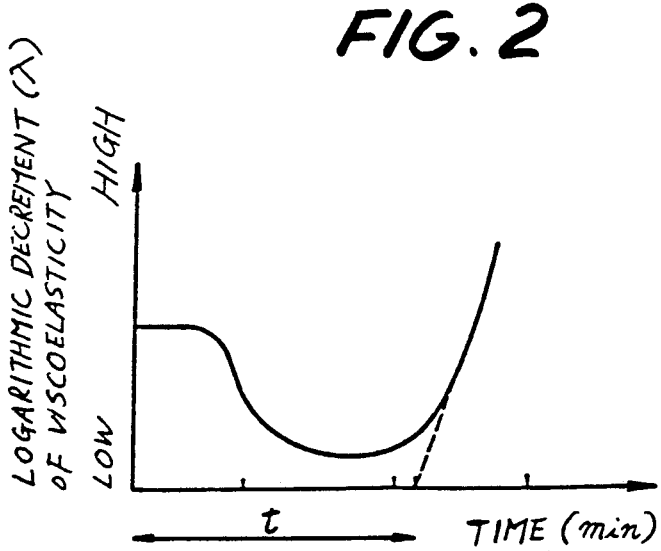
FIG. 2 is a graph showing the relationship between time and logarithmic decrement, for the purpose of determining the hardening starting time t of an intermediate coat paint film forming part of the paint film arrangement according to the present invention.

The analysis for the characteristics of the paint films will be discussed hereinafter with reference to FIGS. 1 and 2.

(1) Determination of Center Line Average Height (Roughness) Ra

The center line average height Ra was measured with a cutoff wavelength of 0.8 mm by using a commercially available surface roughness tester and according to a test method of JIS (Japanese Industrial Standard) B0601. The used tester was a Surfcom 550A produced by Tokyo Seimitsu Co., Ltd in Japan.

(2) Determination of Power Spectrum and Total thereof $\Sigma P_{0.5 \, mm>}$

The power spectrum was able to be easily determined by combining the commercially available surface roughness tester and a FFT (Fast Fourier Transfer) analyzer. In this case, the Surfcom 550A was combined with a commercially available VS 3321A type FFT analyzer produced by Matsushita Communication Industrial Co., Ltd. in Japan.

The power spectrum was determined under conditions of input sensitivity of wavelength: −20 dB, frequency: not more than 100 Hz, and data input number (FFT data processing number): 1,024 points. Measurement was made 10 times, and an average for the 10 measurements was determined to obtain the power spectrum.

$\Sigma P_{5\,mm>}$ was obtained by accumulating the values of the power spectrum within a wavelength not more than 0.5 mm which is a value obtained by dividing the frequency 1.2 Hz by a waveshape input rate (0.6 mm/s in this measurement). The relationship between the spectrum value and the wavelength is shown in FIG. 1. This determining method of the power spectrum and the accumulated value thereof are well known for a method of analyzing a surface profile of a paint film and was disclosed in a technical literature "Colouring Material Study Representation Summary (1985)" issued in Japan.

(3) Determination of Hardening Starting Time of Intermediate Coat Paint

The viscoelasticity of the intermediate coat paint was measured by an oscillated pendulum type viscoelasticity measuring device (trade name "Rheo-Vibron DDV-OPA") produced by Orientec Corporation in Japan, under conditions of a weight: 22 g, moment of inertia: 859 g.cm², and temperature rising rate: 20° C./min. In the course of this viscoelasticity measurement, a time duration t between a time point of starting heating and a time point of starting in rise of a logarithmic decrement λ of viscoelasticity as shown in FIG. 2 was determined to obtain the hardening starting time. FIG. 2 illustrates a method for determining the hardening starting time t for the intermediate coat paint.

In order to evaluate the paint film arrangement of the present invention, production of the electrodeposition paint and the intermediate coat paint and Examples and Comparative Examples obtained by combining above paints will be discussed hereinafter.

Production of Electrodeposition Paint

A variety of electrodeposition paints were prepared by changing the ratio of a low temperature hardening resin and the concentration of pigment to regulate the flowability in a molten state.

Epoxidated polybutadiene containing double bonds was used as the low temperature hardening resin and prepared as set forth below.

First, an epoxidated polybutadiene was prepared as follows: Low polymerization of butadiene was made at 30° C. in the presence of toluene (a chain transfer agent) using benzyl sodium as a catalyst, thereby to obtain liquid polybutadiene which had a number average molecular weight of 2000, a viscosity of 120 poise at 25° and 65% of 1,2-bond. The liquid polybutadiene was epoxidated with peracetic acid thereby to produce an epoxidated polybutadiene having an oxyrane oxygen content of 6.0% by weight.

Next, the low temperature resin (the epoxidated polybutadiene containing double bonds) was prepared as follows: 1076 g of the epoxidated polybutadiene produced in the above-manner was mixed with 215 g of ethylcellosolve and supplied into a 2 liter autoclave. Thereafter, 50 g of dimethylamine was supplied into the autoclave. Then reaction was made at 150° C. for 5 hours. After unreacted amine was removed, a mixture of 83 g of acrylic acid, 7 g of hydroquinone and 27 g of ethylcellosolve was added into the autoclave. A further reaction was made at 150° C. for 45,minutes thereby producing a resin composition of the low temperature hardening resin having an amine value of 40 mgKOH/g, an acid value of 1 mg KOH/g and a solid concentration of 83.3% by weight.

An epoxy resin-acrylic acid addition resin for the purpose of controlling the ratio of the above mentioned low temperature hardening resin was prepared as follows: Bisphenol type epoxy resin (Epikote No. 1001, trade name of Shell Kagaku K.K. in Japan) having an epoxy equivalent of 500 was obtained by reaction between bisphenol A and epichlorohydrin and represented by the following chemical formula:

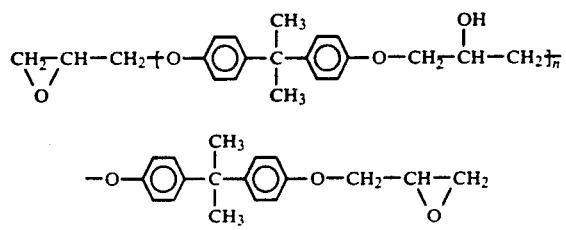

1000 g of the bisphenol type epoxy was desolved in 227 g of ethylcellosolve. In the ethylcellosolve containing the epoxy resin, 137 g of acrylic acid, 0.2 g of hydroquinone and 5 g of N, N-dimethylaminoethanol were added. Then, reaction was made at 100° C. for 5 hours thereby obtaining ethylcellosolve solution of the epoxy resin acrylic acid addition resin.

The above-discussed methods of production of the epoxidated polybutadiene, the low temperature hardening resin and the epoxy resin-acrylic acid addition resin are disclosed in Japanese Patent Publication No. 62-61077.

With the ethylcellosolve solution of epoxy resin-acrylic acid addition resin, the ratio between the low temperature hardening resin (R-1) and the ethylcellosolve solution of epoxy resin-acrylic acid addition resin (R-2) was controlled to have ratios (R-1)/(R-2)=0/1, 1/1, 2/1, and 5/1, thereby preparing four kinds of liquid resin mixtures. It is to be noted that in case of (R-1)/(R-2)=0/1, polyisocyanate compound (produced by Mobay Chemical Co., Ltd.) was mixed in a manner that 1.2 equivalent of NCO was relative to 1 equivalent of OH group of (R-2).

In order to control a pigment concentration, carbon black, lead oxide, and TiO₂ were added to the abovementioned four kinds of liquid resin mixtures in a manner to have P(Pigment)/B(Binder) ratio or solid content ratio of 0.1, 0.2, 0.3 and 0.4, thereby preparing sixteen kinds of electrodeposition paints according to the following method:

500 g of low temperature hardening resin (R-1) and 100 g of the epoxy resin-acrylic acid addition resin ethylcellosolve solution (R-2) were supplied into a 2 liter separable flask and stirred at 80° C. for 1 hour. Thereafter, the content of the flask was cooled to room temperature. 10.6 g of acetic acid was added to the content to neutralize the content. Furtheremore, deionized water was added to the content to control the solid concentration thereby to prepare an aqueous solution having a solid concentration of 30% by weight.

250 g of the above aqueous solution, 20.8 g of carbon black, 104.2 g of lead oxide and 375 g of glass beads were supplied into a 1 liter stainless-steel beaker and vigorously stirred for 2 hours by using a high speed rotation mixer. Thereafter the glass beads were filtered thereby to prepare a pigment paste.

50 g of the above pigment paste and 900 g of the above-mentioned aqueous solution having the solid concentration of 30% by weight were supplied to a 2 liter glass beaker. Then 1035 g of deionized water containing 2.5 g of manganese acetate was added to the content in the glass beaker thereby preparing an electrodeposition paint.

IR. The reaction was terminated at the time at which a conversion had reached a value not less than 98%. Then cooling was made. After cooling, 39.87 parts of xylol was added, thereby obtaining the resin solution of polyester resin modified by $\epsilon$-caprolactone. The solution had a non-volatile content of 79.7% and a resin acid value of 18.6.

The above-discussed production method of the resin solution of polyester resin modified by $\epsilon$-caprolactone is disclosed in Japanese Patent Provisional Publication

TABLE 1

| Production No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| (R-1)/(R-2) | 0/1 | 0/1 | 0/1 | 0/1 | 1/1 | 1/1 | 1/1 | 1/1 | 2/1 | 2/1 | 2/1 | 2/1 | 5/1 | 5/1 | 5/1 | 5/1 |
| P/B | 0.1 | 0.2 | 0.3 | 0.4 | 0.1 | 0.2 | 0.3 | 0.4 | 0.1 | 0.2 | 0.3 | 0.4 | 0.1 | 0.2 | 0.3 | 0.4 |

Production of Intermediate Paint

First, a resin solution of polyester resin modified by $\epsilon$-caprolactone was produced as follows:

Starting materials are listed below.

| Isophthalic acid | 66.45 parts |
|---|---|
| Adipic acid | 14.62 parts |
| Tetrachlorophtalic anhydride | 15.20 parts |
| Trimethylpropane | 10.14 parts |
| Neopentyl glycol | 43.02 parts |
| 1, 6-hexanediol | 26.41 parts |
| $\epsilon$-caprolactone | 17.30 parts |
| Total | 193.17 parts |

The above-mentioned five kinds of the above-listed starting materials except for tetrachlorophthalic anhydride and $\epsilon$-caprolactone were supplied to a chemical reactor equipped with a heating device, a stirring device, a recirculating device, a water separator, a rectifying device, and a thermometer, and were heated. When the starting materials were molten to such an extent that stirring was possible, stirring was started. The temperature in the reactor was raised to 200° C., in which temperature rise was made at a constant temperature raising rate during a time lapse of 3 hours within a temperature range of from 160° to 220° C. Produced condensed water was removed from the reaction system. When the reaction temperature reached 220° C., hot insulation was made. 30 minutes after the hot insulation, 3 parts of xylol as a recirculation solvent was gradually added into the reactor, so that the reaction was changed to a condensation in the presence of the solvent, thus continuing the reaction. When a resin acid value had reached 2.0, the reaction was terminated and the reaction temperature was lowered to 100° C., so that a first polyester prepolymer was obtained.

Subsequently 15.20 parts of tetrachlorophthalic anhydride was supplied into the reactor. The temperature in the reactor was raised to 150° C. When the temperature had reached 150° C., hot insulation was made to continue the reaction. Time-lapse sampling was accomplished, maintaining the temperature 150° C. When the resin acid value was confirmed to be constant at 20, the reaction was terminated accomplishing cooling, thus obtaining a second polyester prepolymer.

Next 17.30 parts of $\epsilon$-caprolactone was supplied to the reactor. The temperature in the reactor was raised to 150° C. When the temperature had reached 150° C., hot insulation was made to continue the reaction. Time lapse sampling was carried out maintaining the temperature of 150° C., tracing unreacted E-caprolactone by No. 61-209278.

The thus produced resin solution of polyester resin modified by $\epsilon$-caprolactone was mixed with melamine resin, controlling a blending ratio (the resin solution/melamine resin). The melamine resin was Cymel 303 (trade name of Mitsui Cyanamid Co., Ltd. in Japan). The intermediate coat paint was prepared according to the detail shown in Table 2. In Table 2, "Solvesso" is the trade name of a dilution thinner produced by Exxon Chemical Co., Ltd. and includes a high boiling point aromatic (petroleum) solvent as a major component. "Surface controlling agent" is a silicone additive produced by Toray Dowcorning Silicone Co., Ltd.

TABLE 2

| Production No. | 17 | 18 | 19 | 20 | 21 |
|---|---|---|---|---|---|
| Titanium white | 63 | 63 | 63 | 63 | 63 |
| Solution of polyester resin modified by $\epsilon$-caprolactone (solid content 80 wt %) | 70 | 75 | 80 | 83 | 85 |
| Solvesso 150 | 14 | 14 | 14 | 14 | 14 |
| Melamine resin | 30 | 25 | 20 | 17 | 15 |
| Methanol | 8 | 8 | 8 | 8 | 8 |
| Surface controlling agent | 9 | 9 | 9 | 9 | 9 |
| The solution of polyester resin/melamine resin (solid content ratio) | 2.3/1 | 3/1 | 4/1 | 4.9/1 | 5.7/1 |
| Hardening starting time according to OPA (min) | 13 | 15 | 20 | 23 | 25 |

Preparation Method of Plate Coated with Electrodeposition Paint

Shot-dulled steel plates of SPCC (according to Japanese Industrial Standard) were chemically treated with PBL3020 (trade name of Nihon Parkerising Co., Ltd. in Japanese). The above-mentioned sixteen kinds of electrodeposition paints were coated respectively on the chemically treated steel plates by electrodeposition in a manner to obtain a coat film thickness of 20 μm under conditions of paint liquid temperature: 28° C., electrodeposition time: 3 minutes, and impressed voltage: 150 to 200 V Thereafter, thus coated paints were subjected to baking at 175° C. for 30 minutes thereby to harden the coated paint films.

Painting Method of Intermediate and Finish Coat Paints

The above-mentioned intermediate paints of Production Nos. 17 to 19 were coated on the above sixteen kinds of electrodeposition-coated steel plates by spraypainting to have a coat film thickness of 30 to 40 um. After allowing the plates to stand for a predetermined time, baking was made at 140° C. for 30 minutes. Subsequently, the respective steel plates coated with the intermediate paints were further coated with an alkyd resin finish coat paint (Melami No. 1500 black: trade name of Nihon Oil & Fats Co., Ltd.) to have a paint film thickness of 35 to 40 um. Then baking was made for each steel plate with the finish coat.

Examples 1 to 22 and Comparative Examples 1 to 25

Concerning a variety of painting systems as shown in Table 3, edge corrosion (rust) resistance and surface profile of the coated electrodeposition paint and finish condition after coating of the finish coat paint were evaluated. The result of the evaluation is shown Table 3. The painting systems of Comparative Examples 1 to 25 are not within the scope of the present invention, while the painting systems of Examples 1 to 22 are within the scope of the present invention. It is to noted that the Comparative Example 1 is a conventional painting system as discussed in the Description of the Prior Art. In Table 3, "flow intermediate coat" is an intermediate coat using an intermediate coat paint which has a good flowability during hardening under baking.

The edge corrosion resistance in Table 3 was measured by the following method: A steel cutter knife blade (LB-10: trade name of OLFA Corporation in Japan) was chemically treated with PBL3020. Each of the above-mentioned sixteen kinds of electrodeposition paints was coated on the chemically treated knife blade and thereafter coated with the electrodeposition paint. Then, the coated electrodeposition paint was baked at 175° C. for 30 minutes. Thereafter the knife blades coated with the electrodeposition paints were subjected to a salt water spraying test of 200 hours. After the test, the number of rusted points at the edge section was counted as shown in Table 3.

TABLE 3

| Painting system | Comparative Example | | | | | | |
|---|---|---|---|---|---|---|---|
| | 1 | 2 | 3 | 4 | 5 | 6 | 7 |
| Surface profile of coated electrodeposition paint | | | | | | | |
| Production No. | 1 | 16 | 1 | 16 | 1 | 16 | 1 |
| Ra ($\mu$) | 0.25 | 0.89 | 0.25 | 0.89 | 0.25 | 0.89 | 0.25 |
| $\Sigma P_{0.5}$ mm> ($\mu V_2$) | 12 | 110 | 12 | 110 | 12 | 110 | 12 |
| Hardening characteristics of intermediate coat paint (hardening starting time (min) by OPA) | | | | | | | |
| Conventional intermediate coat (12 min) | Production No. 17 | Production No. 17 | — | — | — | — | — |
| Flow intermediate coat (15 min) | — | — | Production No. 18 | Production No. 18 | — | — | — |
| Flow intermediate coat (20 min) | — | — | — | — | Prodction No. 19 | Production No. 19 | — |
| Flow intermediate coat (23 min) | — | — | — | — | — | — | Production No. 20 |
| Flow intermediate coat (25 min) | — | — | — | — | — | — | — |
| Edge corrosion resistance (number of rusted points) 200 hr | 100< | 0–1 | 100< | 0–1 | 100< | 0–1 | 100< |
| PGD value after coating of finish coat paint | | | | | | | |
| On horizontal plane | 0.85 | 0.60 | 0.85 | 0.60 | 0.85 | 0.60 | 0.85 |
| On vertical plane | 0.50 | 0.50 | 0.50 | 0.50 | 0.50 | 0.50 | Slight run occurred (0.40) |

| Painting system | Comparative Example | | | | | | |
|---|---|---|---|---|---|---|---|
| | 8 | 9 | 10 | 11 | 12 | 13 | 14 |
| Surface profile of coated electrodeposition paint | | | | | | | |
| Production No. | 16 | 1 | 16 | 15 | 14 | 15 | 14 |
| Ra ($\mu$) | 0.89 | 0.25 | 0.89 | 0.89 | 0.89 | 0.89 | 0.89 |
| $\Sigma P_{0.5}$ mm> ($\mu V_2$) | 110 | 12 | 110 | 95 | 70 | 95 | 70 |
| Hardening characteristics of intermediate coat paint (hardening starting time (min) by OPA) | | | | | | | |
| Conventional intermediate coat (12 min) | — | — | — | Production No. 17 | Production No. 17 | — | — |
| Flow intermediate coat (15 min) | — | — | — | — | — | Production No. 18 | Production No. 18 |
| Flow intermediate coat (20 min) | — | — | — | — | — | — | — |
| Flow intermediate coat (23 min) | Production No. 20 | — | — | — | — | — | — |
| Flow intermediate coat (25 min) | — | Production No. 21 | Production No. 21 | — | — | — | — |
| Edge corrosion resistance (number of rusted points) | 0–1 | 100< | 0–1 | 0–1 | 0–1 | 0–1 | 0–1 |

TABLE 3-continued

| | | | | | | | |
|---|---|---|---|---|---|---|---|
| 200 hr PGD value after coating of finish coat paint | | | | | | | |
| On horizontal plane | 0.75 | 0.85 | 0.75 | 0.65 | 0.70 | 0.70 | 0.75 |
| On vertical plane | Slight run occurred (0.40) | Run occurred (0.35) | Run occurred (0.35) | 0.50 | 0.50 | 0.50 | 0.50 |

| | Comparative Example | | | | | | |
|---|---|---|---|---|---|---|---|
| Painting system | 15 | 16 | 17 | 18 | 19 | 20 | 21 |
| Surface profile of coated electrodeposition paint | | | | | | | |
| Production No. | 15 | 14 | 15 | 14 | 15 | 14 | 13 |
| Ra ($\mu$) | 0.89 | 0.89 | 0.89 | 0.89 | 0.89 | 0.89 | 0.80 |
| $\Sigma P_{0.5\ mm>}$ ($\mu V_2$) | 95 | 70 | 95 | 70 | 95 | 70 | 95 |
| Hardening characteristics of intermediate coat paint (hardening starting time (min) by OPA) | | | | | | | |
| Conventional intermediate coat (12 min) | — | — | — | — | — | — | Production No. 17 |
| Flow intermediate coat (15 min) | — | — | — | — | — | — | — |
| Flow intermediate coat (20 min) | Production No. 19 | Production No. 19 | — | — | — | — | — |
| Flow intermediate coat (23 min) | — | — | Production No. 20 | Production No. 20 | — | — | — |
| Flow intermediate coat (25 min) | — | — | — | — | Production No. 21 | Production No. 21 | — |
| Edge corrosion resistance (number of rusted points) | 0-1 | 0-1 | 0-1 | 0-1 | 0-1 | 0-1 | 0-1 |
| 200 hr PGD value after coating of finish coat paint | | | | | | | |
| On horizontal plane | 0.75 | 0.80 | 0.80 | 0.80 | 0.80 | 0.80 | 0.75 |
| On vertical plane | 0.50 | 0.50 | Slight run occurred (0.40) | Slight run occurred (0.40) | Run occurred (0.35) | Run occurred (0.35) | 0.50 |

| | Comparative Example | | | | Example | | |
|---|---|---|---|---|---|---|---|
| Painting system | 22 | 23 | 24 | 25 | 1 | 2 | 3 |
| Surface profile of coated electrodeposition paint | | | | | | | |
| Production No. | 13 | 13 | 13 | 13 | 2 | 2 | 3 |
| Ra ($\mu$) | 0.80 | 0.80 | 0.80 | 0.80 | 0.30 | 0.30 | 0.38 |
| $\Sigma P_{0.5\ mm>}$ ($\mu V_2$) | 95 | 95 | 95 | 95 | 18 | 18 | 22 |
| Hardening characteristics of intermediate coat paint (hardening starting time (min) by OPA) | | | | | | | |
| Conventional intermediate coat (12 min) | — | — | — | — | | | |
| Conventional intermediate coat (15 min) | | | | | Production No. 18 | — | Production No. 18 |
| Flow intermediate coat (15 min) | Production No. 18 | — | — | — | | | |
| Flow intermediate coat (20 min) | — | Production No. 19 | — | — | — | Production No. 19 | — |
| Flow intermediate coat (23 min) | — | — | Production No. 20 | — | | | |
| Flow intermediate coat (25 min) | — | — | — | Production No. 21 | | | |
| Edge corrosion resistance (number of rusted points) | 0-1 | 0-1 | 0-1 | 0-1 | 30-40 | 30-40 | 30-40 |
| 200 hr PGD value after coating of finish coat paint | | | | | | | |
| On horizontal plane | 0.80 | 0.80 | 0.85 | 0.85 | 0.85 | 0.85 | 0.85 |
| On vertical plane | 0.50 | 0.50 | Slight run occurred (0.40) | Run occurred (0.35) | 0.50 | 0.50 | 0.50 |

| | Example | | | | | | |
|---|---|---|---|---|---|---|---|
| Painting system | 4 | 5 | 6 | 7 | 8 | 9 | 10 |
| Surface profile of coated electrodeposition paint | | | | | | | |
| Production No. | 3 | 4 | 4 | 5 | 5 | 6 | 6 |

TABLE 3-continued

|  | | | | | | | |
|---|---|---|---|---|---|---|---|
| Ra (μ) | 0.38 | 0.40 | 0.40 | 0.51 | 0.51 | 0.55 | 0.55 |
| $\Sigma P_{0.5}$ mm > (μV2) | 22 | 29 | 29 | 50 | 50 | 55 | 55 |
| Hardening characteristics of intermediate coat paint (hardening starting time (min) by OPA) | | | | | | | |
| Conventional intermediate coat (15 min) | — | Production No. 18 | — | Production No. 18 | — | Production No. 18 | — |
| Flow intermediate coat (20 min) | Production No. 19 | — | Production No. 19 | — | Production No. 19 | — | Production No. 19 |
| Edge corrosion resistance (number of rusted points) 200 hr | 30–40 | 5–10 | 5–10 | 1–5 | 1–5 | 0–1 | 0–1 |
| PGD value after coating of finish coat paint | | | | | | | |
| On horizontal plane | 0.85 | 0.85 | 0.85 | 0.85 | 0.85 | 0.85 | 0.85 |
| On vertical plane | 0.50 | 0.50 | 0.50 | 0.50 | 0.50 | 0.50 | 0.50 |

| | Example | | | | | | |
|---|---|---|---|---|---|---|---|
| Painting system | 11 | 12 | 13 | 14 | 15 | 16 | 17 |
| Surface profile of coated electrodeposition paint | | | | | | | |
| Production No. | 7 | 7 | 8 | 8 | 9 | 9 | 10 |
| Ra (μ) | 0.57 | 0.57 | 0.57 | 0.57 | 0.60 | 0.60 | 0.68 |
| $\Sigma P_{0.5}$ mm > (μV2) | 70 | 70 | 80 | 80 | 30 | 30 | 50 |
| Hardening characteristics of intermediate coat paint (hardening starting time (min) by OPA) | | | | | | | |
| Conventional intermediate coat (15 min) | Production No. 18 | — | Production No. 18 | — | Production No. 18 | — | Production No. 18 |
| Flow intermediate coat (20 min) | — | Production No. 19 | — | Production No. 19 | — | Production No. 19 | — |
| Edge corrosion resistance (number of rusted points) 200 hr | 0–1 | 0–1 | 0–1 | 0–1 | 0–1 | 0–1 | 0–1 |
| PGD value after coating of finish coat paint | | | | | | | |
| On horizontal plane | 0.85 | 0.85 | 0.85 | 0.85 | 0.85 | 0.85 | 0.85 |
| On vertical plane | 0.50 | 0.50 | 0.50 | 0.50 | 0.50 | 0.50 | 0.50 |

| | | Example | | | | |
|---|---|---|---|---|---|---|
| | Painting system | 18 | 19 | 20 | 21 | 22 |
| | Surface profile of coated electrodeposition paint | | | | | |
| | Production No. | 10 | 11 | 11 | 12 | 12 |
| | Ra (μ) | 0.68 | 0.78 | 0.78 | 0.80 | 0.80 |
| | $\Sigma P_{0.5}$ mm > (μV2) | 50 | 58 | 58 | 80 | 80 |
| | Hardening characteristics of intermediate coat paint (hardening starting time (min) by OPA) | | | | | |
| | Conventional intermediate coat (15 min) | — | Production No. 18 | — | Production No. 18 | — |
| | Flow intermediate coat (20 min) | Production No. 19 | — | Production No. 19 | — | Production No. 19 |
| | Edge corrosion resistance (number of rusted points) 200 hr | 0–1 | 0–1 | 0–1 | 0–1 | 0–1 |
| | PGD value after coating of finish coat paint | | | | | |
| | On horizontal plane | 0.85 | 0.85 | 0.85 | 0.85 | 0.85 |
| | On vertical plane | 0.50 | 0.50 | 0.50 | 0.50 | 0.5 |

What is claimed is:

1. A paint film arrangement comprising:

a film of an electrodeposition paint, surface of said film having a center line average height Ra within a range of 0.3 μ ≦ Ra ≦ 0.8 μ, total of values of power spectrum within a wavelength range not more than 0.5 mm of said surface being not more than 80 μV²; and a film of an intermediate coat paint, formed on said electrodeposition paint film, said intermediate coat paint film having a hardening starting time ranging from 15 to 20 minutes, said hardening starting time being determined according to a log arithmic decrement of viscoelasticity of the intermediate coat paint film by an oscillated pendulum type viscoelasticity measuring device.

2. A paint film arrangement as claimed in claim 1, wherein said electrodeposition paint includes epoxidated polybutadiene containing double bond, epoxy resin having added acrylic acid, and pigments.

3. A paint film arrangement as claimed in claim 1, wherein said intermediate coat paint includes polyester resin modified by ε-caprolactone, and melamine resin.

4. A paint film arrangement as claimed in claim 1, further comprising a film of a finish coat paint.

5. A paint film arrangement as claimed in claim 4, wherein said finish coat paint has a main component of alkyd resin.

6. An outer panel of an automotive vehicle, comprising:
 a steel plate;
 a film of an electrodeposition paint formed on a surface of said steel plate, a surface of said film having a center line average height Ra within a range of $0.3\mu \leq Ra \leq 0.8\mu$, total of values of power spectrum within a wavelength range not more than 0.5 mm of said surface being not more than 80 $\mu V^2$;
 a film of an intermediate coat paint formed on said electrodeposition paint film said intermediate coat paint film having a hardening starting time ranging from 15 to 20 minutes, said hardening starting time being determined according to a logarithmic decrement of the intermediate coat paint film by an oscillated pendulum type viscoelasticity measuring device; and
 a film of a finish coat paint formed on a surface of said intermediate coat paint film.

* * * * *